Dec. 15, 1959   R. F. BRENNEN ET AL   2,917,618
APPARATUS FOR FEEDING WELDING ELECTRODES
Filed Feb. 20, 1959   2 Sheets-Sheet 2

INVENTOR.
RONALD F. BRENNEN
JAMES A. BUCCI

BY

ATTORNEYS

United States Patent Office

2,917,618
Patented Dec. 15, 1959

2,917,618

APPARATUS FOR FEEDING WELDING ELECTRODES

Ronald F. Brennen and James A. Bucci, Brooklyn, N.Y.

Application February 20, 1959, Serial No. 794,673

12 Claims. (Cl. 219—127)

The present invention is directed to an apparatus for welding, more particularly to an electrode holder adapted for spot welding, called a "weld gun".

It is among the objects of the invention to provide an apparatus of the above type which is light in weight, is well balanced and is easy to manipulate.

It is also among the objects of the present invention to provide a mechanism which is adapted to predetermine or to measure the amount of metal to be used in making a spot weld.

It is further among the objects of the invention to provide an apparatus which consists of relatively few parts, is economical to produce, is sturdy, and in which the electrode is protected against accidental damage.

In practicing the invention there is formed a holder which is preferably in the shape of a box, with a handle or grip integral with and extending downwardly from said holder. A welding electrode is adapted to be clamped in the front wall of the holder and to extend forwardly. The free end of the electrode passes into a shroud.

At least one, and preferably two, guided rods have their front ends anchored in the shroud and the rear ends thereof pass through the front and rear walls of said holder which acts as a guide for the sliding movement of the rods. The electrode is located between the rods, and it passes through an opening in an insulator fixed in the shroud. The clamped end of the electrode is electrically insulated from the holder.

Mounted on one of the rods inside of the box, is a plate, the plane of which is transverse to the axis of the rod. Said plate has a resilient washer which frictionally engages the rod. The plate is generally in the form of a disk. On the side wall of the holder adjacent to the plate is a cam transverse to and adapted to contact the plate in its rearmost position. The cam is mounted on a stub shaft extending through the side wall and an operating knob is secured on the other end of said stub shaft. The knob operates over a graduated dial, whereby the rearmost position of the plate may be varied in order to vary the amount or length of electrode used in making a spot weld.

In the accompanying drawing constituting a part hereof and in which like reference characters indicate like parts, Fig. 1 is a side elevational view of a weld gun with means for feeding the electrode and made in accordance with the present invention;

Fig. 4 is a detail view showing the mounting of the plate on its rod, and

Fig. 5 is an elevational view of the front of the shroud and its associated elements.

Figure 1:
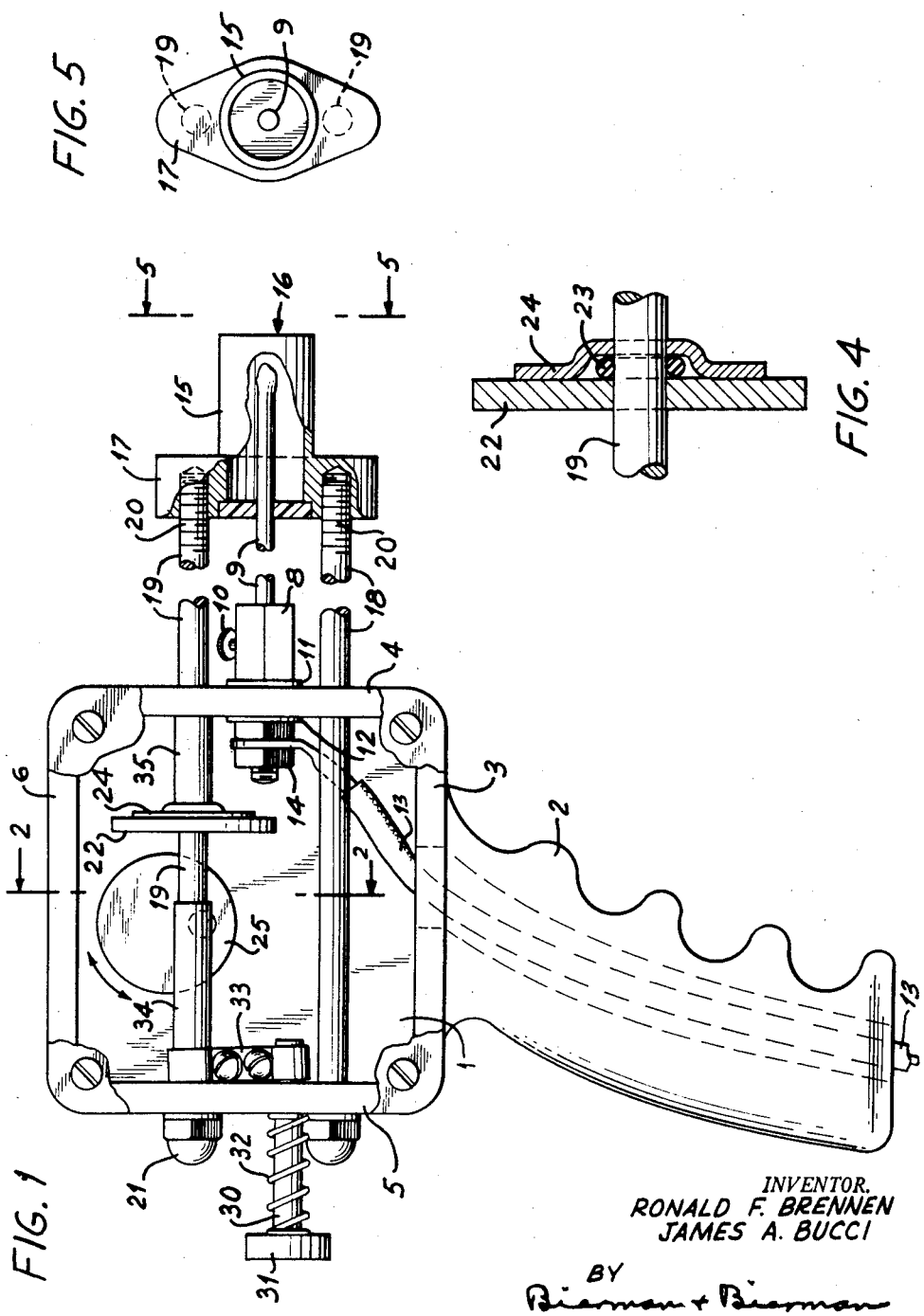
Figure 2:
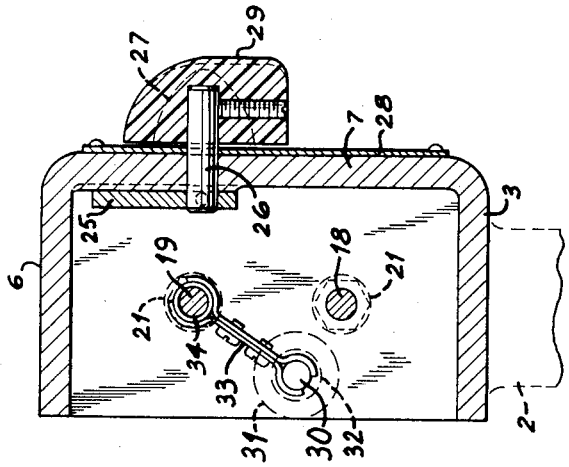
Fig. 2 is a transverse, cross-sectional view taken along line 2—2 of Fig. 1.
Figure 3:
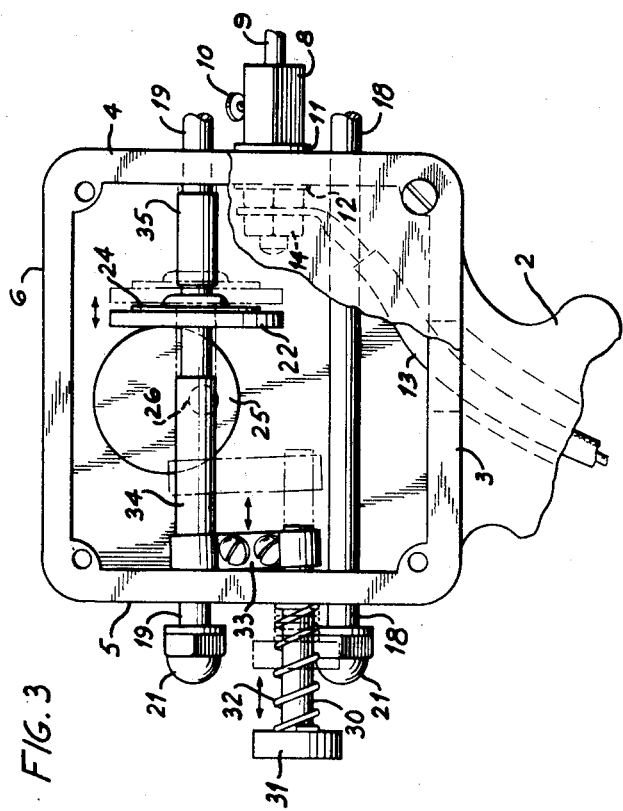
Fig. 3 is an enlarged fragmentary side elevational view showing the positions of certain elements in the course of the operation of the apparatus.

The holder 1 is in the form of a rectangular box and has a handle or grip 2 formed integrally with and depending from bottoms 3 of the holder, which has front wall 4, rear wall 5, top wall 6, and side wall 7. The sixth side is open to permit access into the interior of the holder and is closed by a cover, not shown. In an opening in front wall 4 is mounted an electrode holder or clamp 8 into which one end of electrode 9 is held by set screw 10. Washers 11 and 12 on opposite sides of front wall 4 are adapted to insulate clamp 8 from holder 1. A cable 13 is held on the inside of clamp 8 by nuts 14.

A shroud 15 having a central bore 16 for the passage of the free end of electrode 9, is integral with its base 7, which serves as means for holding rods 18 and 19 by their threaded ends 20. The rear portions of rods 18 and 19 pass through openings in walls 4 and 5 which act as guides for the sliding movements of the rods. Cap screws 21 are threaded onto the ends of said rods. As more particularly shown in Fig. 4, a plate or disk 22 is loosely mounted on the rear portion of rod 19, and has a resilient O-ring washer held for frictional engagement with rod 19 by cover 24 welded onto plate 22.

Adjacent to plate 22 on the inside of wall 7 is cam 25 which is in the path of the sliding movement of plate 22. The cam is held on stub shaft 26 having on the other end on the outer face of wall 7, a knob 27. Dial 28 over which pointer 29 of knob 27 moves, is calibrated, whereby the positions of the cam may be predetermined.

Plunger 30 passing through rear wall 5 has a head 31 on the outer end, being biased rearwardly by coil spring 32. Clamp 33 grips the inner end of plunger 30 and the rear end of sleeve 34 which is loosely mounted on rod 19. A second sleeve 35 in front of plate 22 and also loosely mounted on rod 19 is adapted to contact the inner face of wall 4 and the front of plate 22.

In the operation of the apparatus, the elements are in the positions shown in Fig. 1. The front of the nose guide or shroud 15 is slightly in front of electrode 9. The handle is grasped by the hand of the operator who presses head 31 and holds it while pressing shroud 15 against the work, causing rods 18 and 19 to move back and bringing the tip of the electrode flush with the end of shroud 15. The thumb is removed from the head allowing plunger 30 and sleeve 34 to retract by spring 32. The current is caused to flow through electrode 9 forming an arc to the work, the arc being extinguished when sufficient metal has melted away. By adjusting the position of cam 25, the length of electrode 9 consumed is predetermined. As the electrode is consumed, rods 18 and 19 move back with plate 22, the edge of which eventually contacts cam 25 causing plate 22 to bind on rod 19 and act as a stop to further movement.

We claim:

1. Apparatus for feeding electrodes comprising a holder, a handle depending therefrom, a clamp on said holder for gripping one end of an electrode, the other end of said electrode extending forwardly of said holder to a point adjacent to the work, a shroud surrounding said other end of said electrode, at least one guided rod having one end secured to said shroud, the other end of said rod slidably mounted on said holder, a cam mounted on said holder, a transverse plate slidably mounted on said rod and adapted to contact said cam, means on said holder for moving said cam to vary the travel of said plate, propelling means on said holder adapted to advance said plate and means for retracting said propelling means, whereby the length of electrode to be consumed may be predetermined.

2. Apparatus for feeding electrodes according to claim 1 in which said holder is a box, said plate and cam being within said box.

3. Apparatus for feeding electrodes according to claim 1 in which said holder is a box, said plate and cam being within said box, and said rod passing through the front and rear walls of said box.

4. Apparatus for feeding electrodes according to claim 1 in which a sleeve is loosely mounted on said rod at the rear of said plate, said propelling means being attached to said sleeve at the rear thereof.

5. Apparatus for feeding electrodes according to claim 1 in which a sleeve is loosely mounted on said rod at the rear of said plate, said propelling means being attached to said sleeve at the rear thereof, and a spring for retracting said sleeve towards the rear wall of said box.

6. Apparatus for feeding electrodes according to claim 1 in which there are two spaced parallel rods attached to said shroud, said electrode being located between said rods.

7. Apparatus for feeding electrodes according to claim 1 in which said cam is mounted on a stub shaft passing through a side wall of said holder, and an operating knob on said shaft on the outside of said holder.

8. Apparatus for feeding electrodes according to claim 4 in which a second sleeve is loosely mounted on said rod forwardly of said plate.

9. Apparatus for feeding electrodes according to claim 1 in which said plate is frictionally held on said rod.

10. In a holder for feeding electrodes, the improvement which comprises a cam mounted on said holder, an electrode mounted on said holder, a guided rod adjacent to said cam, a transverse plate slidably mounted on said rod and adapted to contact said cam, said contact causing said plate to cant and bind on said rod to stop the movement of said rod.

11. In a holder according to claim 10 in which said rod is attached to a shroud surrounding the end of said electrode.

12. In a holder according to claim 10 in which said cam is mounted on a stub shaft in a wall of said holder, and a knob on the end of said shaft for adjusting the position of said cam.

References Cited in the file of this patent

UNITED STATES PATENTS

| | | |
|---|---|---|
| 2,550,495 | Pilia | Apr. 24, 1951 |
| 2,673,278 | Anderson | Mar. 23, 1954 |